United States Patent [19]
Speer

[11] Patent Number: 5,493,817
[45] Date of Patent: Feb. 27, 1996

[54] MOBILE WORKSHOP AND METHOD OF CONFIGURING SAME

[76] Inventor: Jerry Speer, 214 E. Fairfield Dr., Broussard, La. 70518

[21] Appl. No.: 293,904

[22] Filed: Aug. 22, 1994

[51] Int. Cl.$^6$ .............................. B60P 3/022; B60P 3/29; B65D 88/52
[52] U.S. Cl. .............................. 52/69; 52/79.5; 52/143; 52/745.14; 52/745.2; 312/321.5; 220/1.5
[58] Field of Search .................................. 52/69, 71, 79.5, 52/143, 29, 36.1, 745.14, 745.2, 249.1; 220/1.5; 206/372, 373; 312/321.5, 902

[56] References Cited

U.S. PATENT DOCUMENTS

| | | |
|---|---|---|
| 2,365,940 | 12/1944 | Couse . |
| 2,505,658 | 4/1950 | Wilson . |
| 3,182,424 | 5/1965 | Betjemann ................................. 52/69 |
| 3,633,970 | 1/1972 | Langhals . |
| 4,055,206 | 10/1977 | Griffin . |
| 4,133,572 | 1/1979 | Robbins et al. . |
| 4,230,358 | 10/1980 | Legueu . |
| 4,240,646 | 12/1980 | Scott ..................................... 52/143 X |
| 4,262,812 | 4/1981 | Bremenkamp . |
| 4,285,556 | 8/1981 | Loeffel .................................. 352/244 |
| 4,516,308 | 5/1985 | Urban . |
| 4,891,919 | 1/1990 | Palibroda ................................ 52/79.5 |
| 5,170,901 | 12/1992 | Bersani ................................... 570/1.5 |
| 5,237,784 | 8/1993 | Ros ....................................... 52/69 X |
| 5,285,604 | 2/1994 | Carlin .................................. 52/79.5 X |
| 5,375,899 | 12/1994 | Wright ................................. 52/79.5 X |

OTHER PUBLICATIONS

Griffith Drilling Tools brochure, pp. 977 and 989–992.
Houston Engineers, Inc. General Catalog 1994–1995, Drilling and Fishing Tools, pp. 1417, 1448–1450, and 1452; Nov. 1993.

Primary Examiner—Carl D. Friedman
Assistant Examiner—Robert J. Canfield
Attorney, Agent, or Firm—Pravel, Hewitt, Kimball & Krieger

[57] ABSTRACT

An improved mobile workshop system for manufacturing, maintaining, inspecting, servicing, or testing downhole equipment, which provides a structure having four walls, a top, and a floor portion, the structure having the capacity to be transported as a closed container or box to the work site. Within the structure is provided a plurality of stationary machinery items, such as hydraulic vises, floor jacks, and hydraulic tongs, the machinery items mounted to the sidewalls of the container; thus, providing valuable tool and equipment storage space on the floor of the container. There is further provided a retractable crane system along the top interior of the container, so that when the container is placed on the job site, the walls of the container may retract from the vertical position, as container walls, to the horizontal position, lowering the machinery into operational position upon the horizontally positioned sidewalls, now defining the secondary base of the workshop. The various tasks to the downhole equipment would now be carried out by the machinery, and the floor of the structure would function as storage space for the system. The crane arms are extended outward to define a workable overhead crane for transporting downhole equipment throughout the work space. Other tools and machinery are accessible from the storage space provided within the container when the workshop configuration is established.

18 Claims, 4 Drawing Sheets

MOBILE WORKSHOP AND METHOD OF CONFIGURING SAME

BACKGROUND OF THE INVENTION

1. Field of the Invention

The present invention relates to mobile workshops. More particularly, the system of the present invention relates to an improved mobile workshop of the transportable type for use on oil rig sites for manufacture, maintenance, testing and servicing of downhole tools, configured to maximize the work space and storage space of the workshop.

2. General Background

In the drilling and completion of both offshore and on land oil rigs, there is the need to constantly maintain, repair and refurbish downhole drilling, completion or production equipment, particularly downhole motors. Such motors are usually 20 to 25 feet in length, and when retrieved from downhole, need to be disassembled and the maintenance or refurbishing work done at the rig site. If the motors have to be shipped to a remote location, the shipping expense is great, and the amount of time lost from the operation of the rig can be very costly. Therefore, there is known in the industry as mobile workshops. Companies such as Houston Engineers, Inc., Becfield, Inc. and Griffith Oil Tool are such companies which manufacture a mobile workshop to be placed at a rig site. Usually, such a workshop is housed within a closed structure, such as a container and shipped to the rig site. The structure would house the necessary machinery, such as hydraulic vices, floor jacks, jib cranes, and the like, mounted to the floor of the structure in order to do the work on the downhole equipment.

In those mobile workshops currently known to applicant, the workshops fall short in several areas. For example, in addition to the machinery which is mounted in the mobile workshops, there is often a great deal of other equipment and tools which must be stored in order to fully equip such workshops. However, because the machinery is mounted on the base of the container, the storage space in the container is severely hampered, and what results is the need to provide a second or even third container for providing storage space, or further work space especially for larger tool sizes such as 8" and larger. Additionally, because of the enormity of these downhole drill motors, one cannot easily operate within the confines of the floor space provided for the machinery, and the drill motors must be removed from the workshop, usually with a forklift, in order to be turned around, and then returned into the workshop for the needed work.

Therefore, there is a need for an improved mobile workshop which allows for both space for equipment and storage space within the same workshop container in standard transportation dimensions, without the need to have additional containers for storage, or additional machinery, such as forklifts, in order to move the downhole motors within the workshop during operation.

SUMMARY OF THE PRESENT INVENTION

The system of the present invention, together with the method of configuring the system, solves the problems confronted in the art in a simple and straightforward manner. What is provided is an improved and completed mobile workshop system for manufacturing, maintaining, inspecting, servicing, or testing downhole drilling equipment, which provides a structure having four walls, a top, and a floor portion, the structure having the capacity to be transported as a closed container with standard transportation dimensions to the work site. Transportion can be in the form of truck, tractor, boat or ship. Within the structure is provided a plurality of stationary machinery items, such as hydraulic vises, a floor jack, and hydraulic tongs, the machinery items mounted to the sidewalls of the container; thus, providing valuable tool and equipment storage space on the floor of the container. When the container is placed on the job site, the walls of the container may retract from the vertical position, as container walls, to the horizontal position, lowering the machinery into operational position upon the horizontally positioned sidewalls, now defining the secondary base components of the workshop. The various tasks to the downhole equipment would now be carried out by the machinery, and the floor of the structure would function as storage space and work space for the system. There is further provided a retractable crane system along the top interior of the container, The crane arms extendable outward to define a workable overhead crane for transporting downhole drill equipment throughout the work space. Other tools and machinery are accessible from the storage space provided within the container when the workshop configuration is established.

Therefore, it is a principal object of the present invention to provide a mobile workshop configured as a container having adequate storage space during transport, and when reconfigured, providing maximum workshop space for the machine elements for working on downhole motors;

It is a further principal object of the present invention to provide a mobile workshop which positions the stationary machinery items in such a way in the containerized configuration, so that the container provides adequate storage space during transport, yet provides generous work space when reconfigured to the mobile workshop configuration;

It is a further object of the present invention to provide a mobile workshop, transportable within transportation standards as a closed container, and able to be reconfigured into a mobile workshop provided significant storage space and work space, by utilizing the walls of the container as part of the workshop base for mounting stationary machinery.

It is a further object of the present invention to provide a mobile workshop which provides for significant storage space within the containerized configuration through mounting of the stationary machinery items on the walls of the container, which can be lowered down as part of the workshop base on site.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
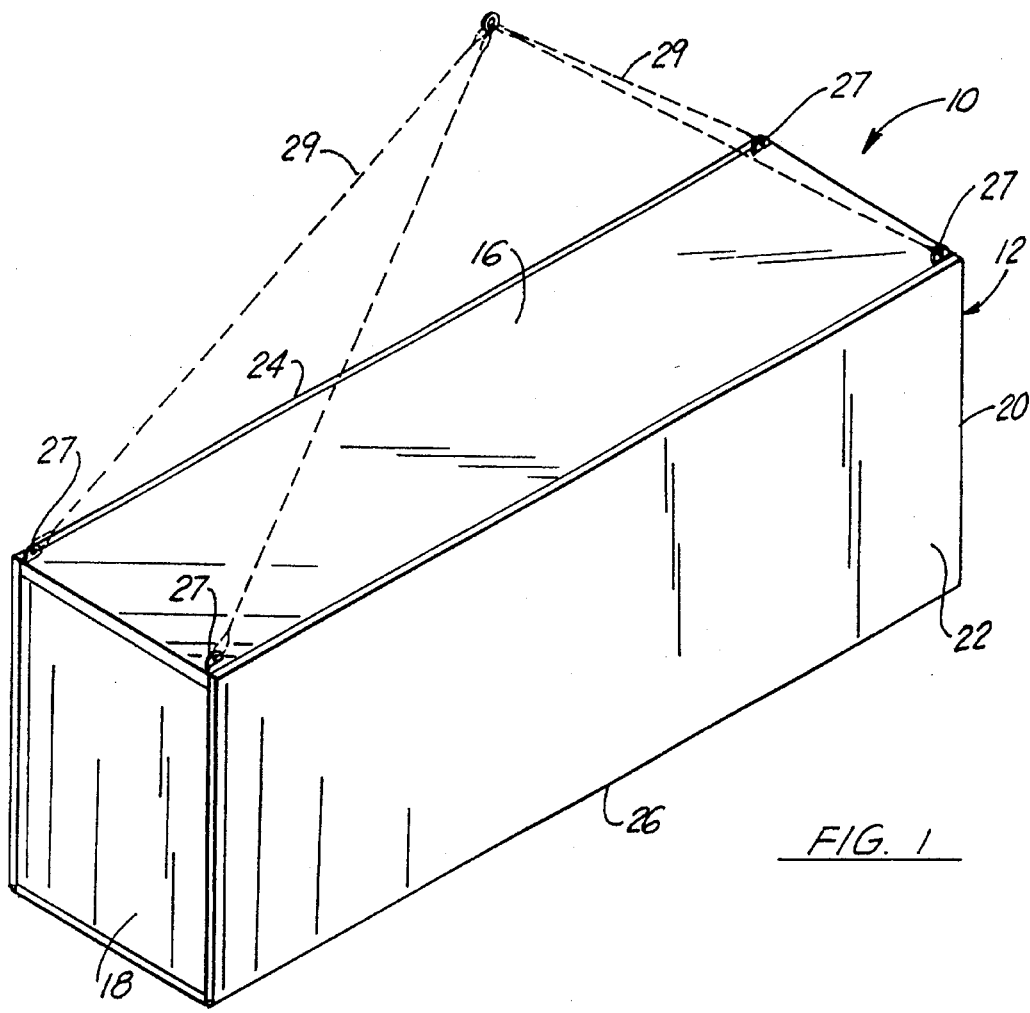
FIG. 1 illustrates an overall perspective view of the preferred embodiment of the present invention in the shipment container configuration.
Figure 2:
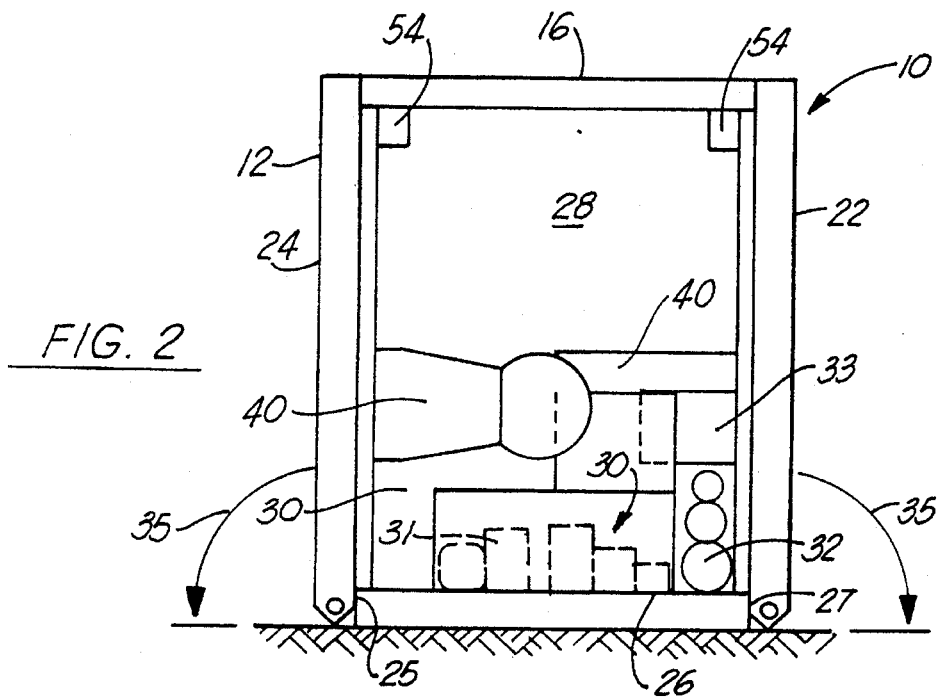
FIG. 2 illustrates an open end view of the preferred embodiment of the present invention in the shipment container configuration.

The preferred embodiment of the present invention is illustrated in FIGS. 1 through 5 by the numeral 10. As illustrated in FIGS. 1 and 2, the improved mobile workshop 10 is in the closed containerized configuration 12, and in FIGS. 3, 4 and 5, in the fully open, workshop configuration 14. Workshop 10, while in the containerized configuration 12 is capable of being transported in standard sizes anywhere in the world, and set on a job site. As illustrated in FIG. 1, the workshop 10 would resemble a container having a top portion 16, a pair of end walls 18, 20, a pair of side walls 22, 24 and a floor portion 26, all together defining a central container space 28 (See FIG. 2) therewithin. The container 12 would include a plurality of padeyes 27 for allowing a crane to lift the container 12 onto the vessel via cables 29, for shipment and delivery. The container 12 would also include a skid base to allow a truck to drag the container on the ground.

To fully appreciate the importance of the containerized configuration 12, reference is made to FIG. 2, wherein the system is illustrated in open end view. As illustrated, the primary container space 28 is-provided with the four upright walls 18, 20, 22, 24, defining the primary container space 28. Container space 28 defines a storage area 30 along the floor portion 26 of container 12, as a primary storage area within the container for housing the various tools 31, and the stators 32. These are stored in individual storage bins 33, along floor portion 26 to prevent movement of the tools 31 and stators 32 during shipment. This storage area 30 on the floor 26 of container 12 is available during shipment of the container because, as illustrated in FIG. 2, the principal machinery components 40, such as hydraulic vices, power tongs, and other mounted power machinery, are stationarily mounted on the interior of the sidewalls 22, 24 of container 12. For purposes of discussion any of the machinery which would be mounted on the sidewalls 22, 24 of container 12 will be referred to as machinery components 40. Therefore, as illustrated in FIG. 2, when sidewalls 22, 24 are in the vertical position, the machinery components 40 are suspended above the floor 26 and extend outward into the container space 28. Therefore, machinery components 40 do not take up valuable floor space, which can be utilized as storage space 30.

Figure 3:
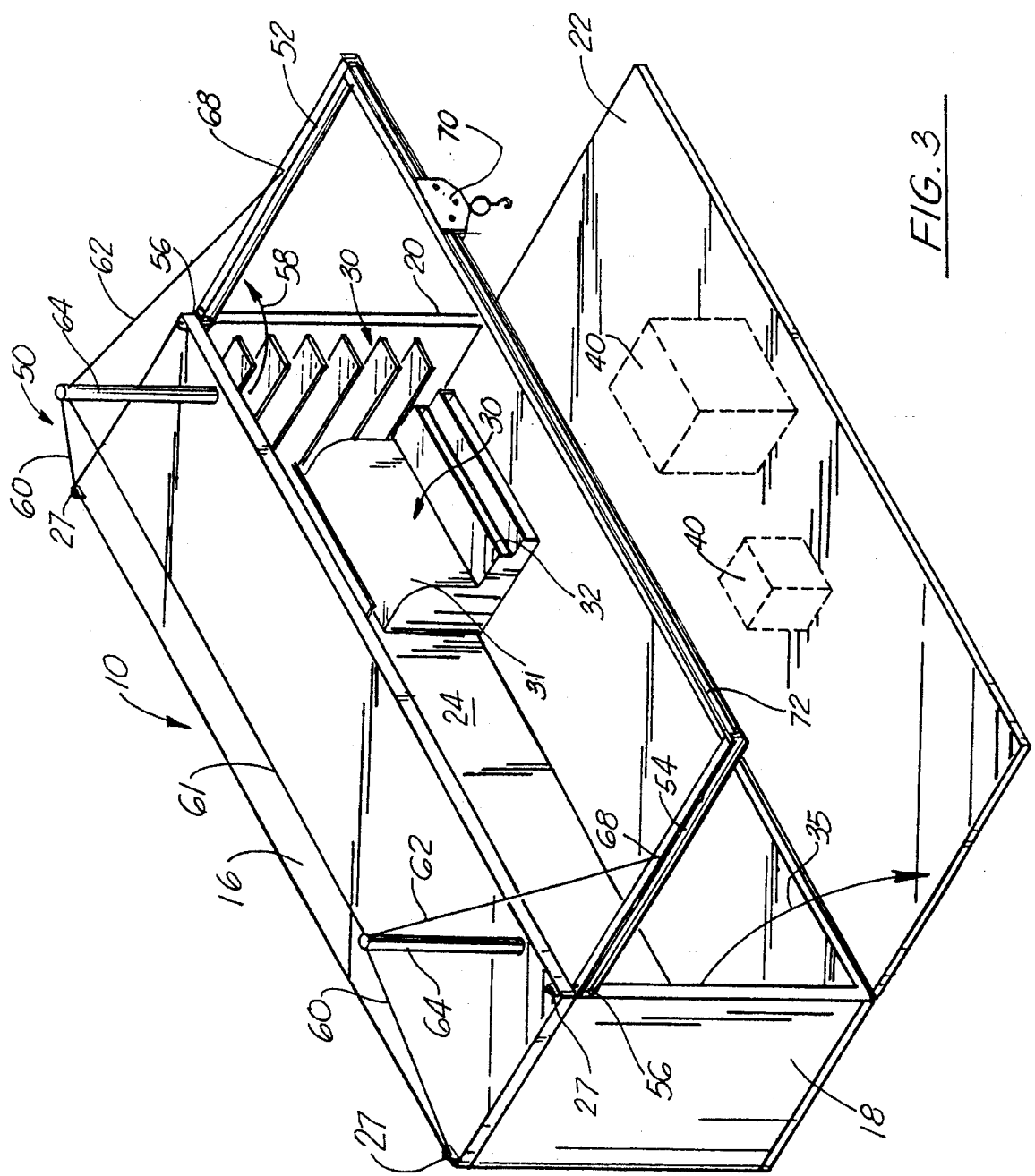
FIG. 3 illustrates an overall perspective view of the preferred embodiment of the present invention in the workshop configuration with a single vertical side wall fully lowered.
Figure 4:
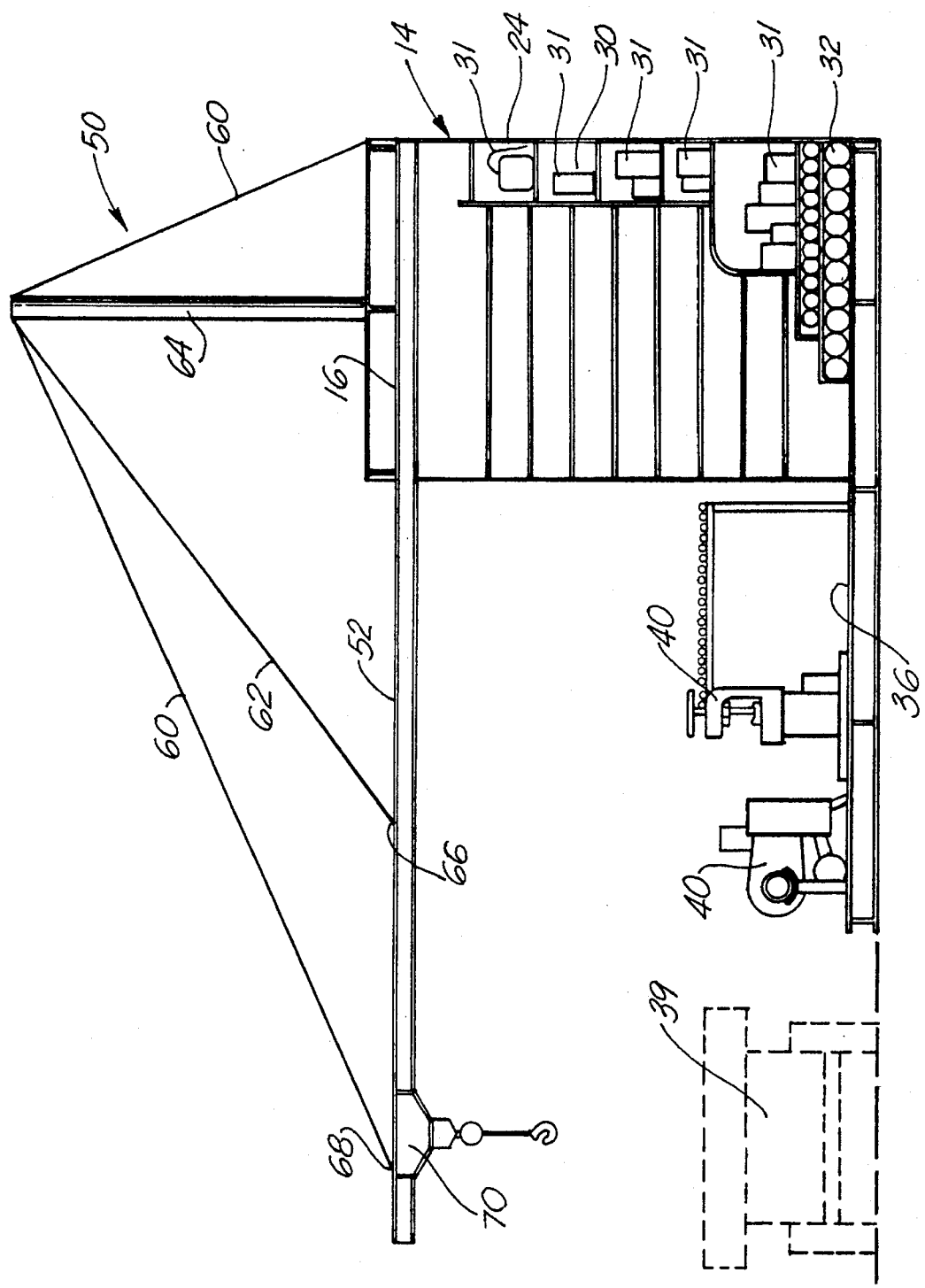
FIG. 4 illustrates an overall end view of the preferred embodiment of the present invention in the workshop configuration with one vertical side wall fully lowered.

FIGS. 3 and 4 illustrate the workshop 10, which was configured as container 12 during shipping, after it has reached its destination, such as a rig site, and is ready for reconfiguration into a mobile workshop 14. As illustrated in FIGS. 3 and 4, mobile workshop 10 is seen in perspective and end views, respectively, having only one vertical sidewall 22 lowered from its vertical shipment position to its second horizontal position. The lowering of vertical sidewall 22 is accomplished by the hinging of the wall to the floor portion 26 at points 25, 27a, and the lowering of the sidewall 22 as seen by arrows 35. In the preferred embodiment the sidewall 22 would be lowered via a cable, winch, hydraulic system or the like from the top 16 of workshop 14. Workshop 14, overall, as illustrated in the FIGURES, would comprise the overall floor portion 26, and the lowered floor portion 22, which now comprises first secondary base portion 36, hingedly attached to floor 26 at points 25, 27a. The secondary base 36 is formed by the lowered sidewall 22 of the container 12. The workshop configuration 14 further includes vertical end walls 24, 26, and the rear wall 28a, wherein there would be incorporated the storage area 30, where various tools, equipment 31, or stators 32, would be stored during transport of the workshop 14 or during the operation.

Figure 5:
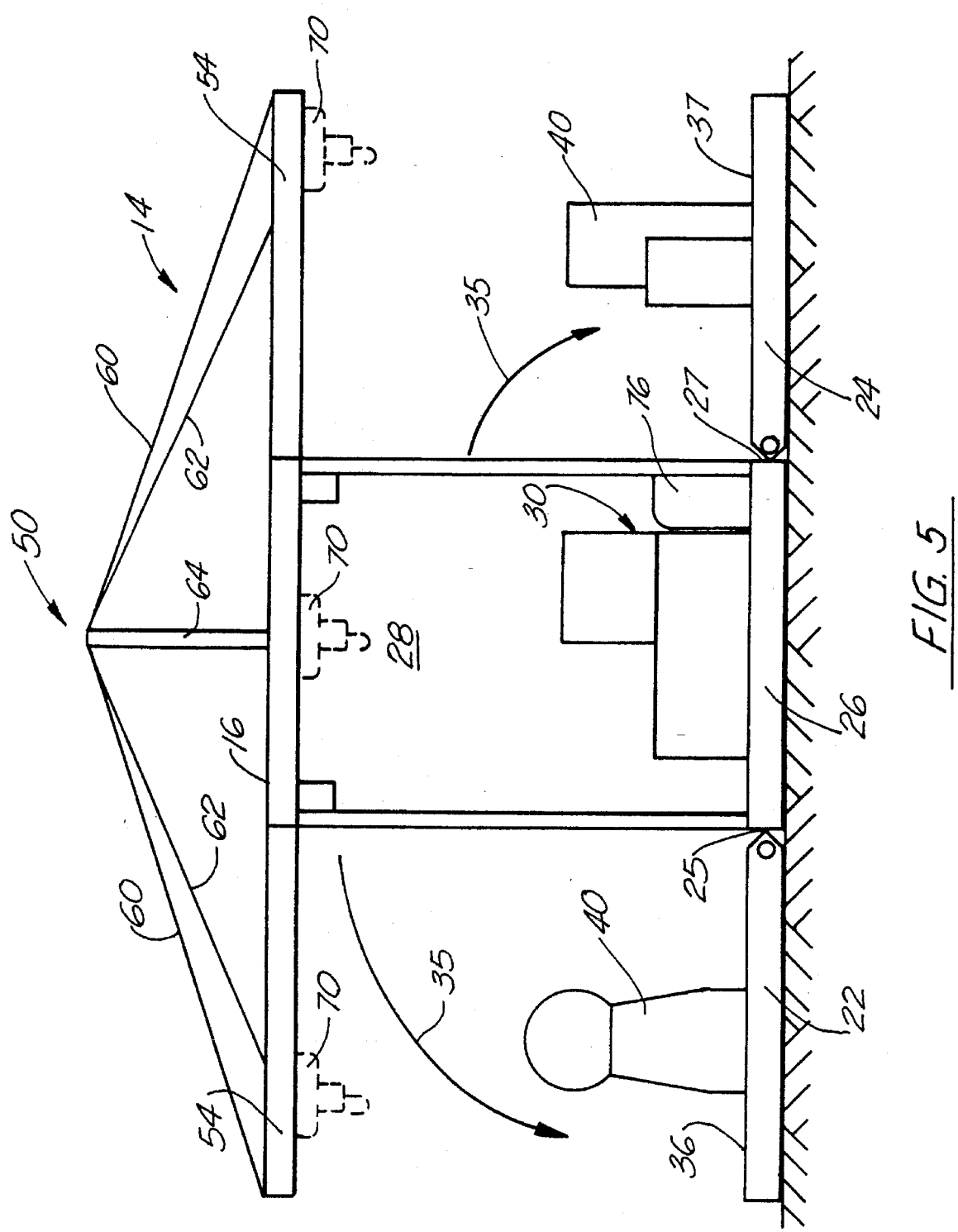
FIG. 5 illustrates an overall end view of the preferred embodiment of the present invention in the workshop configuration with both vertical sidewalls fully lowered.

A further vital component included as part of the workshop 14 is overhead crane means 50, having approximately a 2–3 ton capacity. As seen in FIGS. 3, 4 and 5, crane means 50 is in its extended state, extending out over the machinery components 40, mounted on the secondary base portion 36, 37. As illustrated, crane means 50 comprises a pair of overhead crane arms 52, 54, each arm hinged at point 56 to the top portion 16 of workshop 14, so that, when the workshop 10 is in the containerized configuration 12, the arms are retracted into the interior 28 of the container 12. When the walls 22, 24 are lowered as seen in FIG. 5, to define secondary base portions 36, 37 the arms 52, 54, are then swung outward, as illustrated by arrows 58 in FIG. 3, and are held in position by support cables 62 extending from a vertically aligned post 64, mounted on the exterior of top 16 of workshop 14, to connection points 66 along the length of cantilevered crane arms 52, 54. Also, there are second cables 60, which extend from post 64 rearwardly down to a connection point 68 on the top 16 of the container 10, and a connector cable 61 interconnecting the posts 64 across the length of container 10 for stability.

In order to move the large drill motors within the work area crane means 50 would include a hoist 70, mounted above the machinery components 40 on a beam 72 extending and supported by the crane arms 52, 54 so that hoist 70 may move along the length of the beam 72, and carry the drill motors across the floor portion 26 and the secondary base portions 36, 37, during operations. As seen in FIG. 4, because the machinery components 40 are mounted on the secondary base portion 36, 37, which serve as wall 22, 24 in the containerized configuration 12, the machinery 40 is positioned away from the storage space 30, and in such a manner, so as to provide a far greater work space along base portions 36, 37 for the working of the drilling equipment by the machinery, together for transport with the overhead crane means 50. It is forseen that a plurality of hoists 70 could be utilized for moving above the base portions 36, 37 and storage space 30 for maximizing the use of crane means 50.

In the preferred embodiment, the machinery components 40 would be powered by a power-generating means, such as a gasoline-powered generator 76, mounted within the container space 28. In terms of the relative height of the crane means 50, FIG. 4 illustrates a vehicle 39 positioned below hoist 70 so that it is clear that trucks of the like may be able to maneuver below the crane structure 50 and serve the workshop 14.

Although FIGS. 3 and 4 illustrate only sidewall 22 lowered, in the preferred embodiment, for maximum use of the workshop 14, both sidewalls 22, 24 would be lowered as seen in FIG. 5, each defining work areas as will be described below. As illustrated in end view in FIG. 5, both sidewalls 22, 24 have been lowered from the vertical position to the fully horizontal position, wherein they serve as the secondary bases 36, 37 respectively. When lowered as seen in FIG. 5, the machinery components 40, mounted to walls 22, 24, such as power tongs, and hydraulic vices, and perhaps other machinery components 40, have been moved from their storage positions, within the container 12, to the operation positions, supported on bases 36, 37, in which to undertake the tasks which need to be undertaken on the downhole tools. Importantly, the tools, while being worked, are not confined to the cramped work stations on the container floor, as seen in the prior art, but because the machinery elements are positioned outside, on the secondary bases 36, 37, more efficient and productive working conditions are available. Through this novel means of positioning the machinery on the sidewalls 22, 24, the system solves the problems of the machinery interfering with valuable storage space during shipment and operation of the machinery, while allowing the machinery to operate in a broader work environment at the job site. Of course, as illustrated in FIG. 5, the crane means 50, as discussed previously in relation to FIGS. 3 and 4, would be in position in the same manner. However, as seen in FIG. 5, each side wall 22, 24 which has been lowered into position would be equipped with a separate crane means 50 and the various structural components as recited earlier, so that each secondary base 36, 37 and the floor position 26 would have equal capacity to function in working with the various machinery components 40 to work with the drill motors.

For purposes of explanation, it is understood that, if one may choose to only lower one vertical wall, for example, wall 22, so that when that wall is folded downward, it would define a single secondary base 36. Or, one could choose to lower both sidewalls 22, 24, and have a fully operational workshop 14 with twice the capacity for work, if necessary. The machinery mounted on both secondary base portions 36, 37 would be utilized, and again would not be positioned on the primary floor portion 26, which is used for tool and equipment storage.

The mobile workshop, therefore, can be transported in standard sizes to any remote job site for immediate use. Although the primary discussion of the workshop addressed its use with downhole tools, such as drill motors, it is foreseen that such mobile workshops, configured like the present invention, may be utilized in various industries which require repair or refurbishing work on tools at the site, without having to transport the tools to another site for work on the tools.

The following table lists the part numbers and part descriptions as used herein and in the drawings attached hereto.

| PARTS LIST | |
|---|---|
| Part Number | Description |
| 10 | mobile workshop |
| 12 | containerized configuration |
| 14 | workshop configuration |
| 16 | top portion |
| 18, 20 | end walls |
| 22, 24 | side walls |
| 25, 27 | points |
| 26 | floor portion |
| 28 | central container space |
| 27 | padeyes |
| 29 | cables |
| 30 | storage area |
| 31 | tools |
| 32 | stators |
| 33 | storage bins |
| 35 | arrows |
| 36 | first secondary base |
| 37 | second secondary base |
| 39 | vehicle |
| 50 | overhead crane means |
| 52, 54 | crane arms |
| 56 | point |
| 58 | arrows |
| 60, 62 | support cables |
| 61 | connector cable |
| 64 | post |
| 66, 68 | connection points |
| 70 | hoist |
| 72 | beam |
| 74 | power-generating means |
| 76 | gasoline-powered generator |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A mobile workshop system, comprising:
   a) a structure, said structure configurable from a first closed container, said container having sidewalls, a top and a floor, to a second open configuration as a workshop;
   b) machinery elements mounted on at least one sidewall of the structure; and
   c) the one sidewall of the structure foldable from a first vertical position when the structure is configured as a closed container to a second position, when the structure is configured as a workshop, defining a base portion for the machinery mounted thereto to be operated.

2. The system in claim 1, wherein there may be included a second sidewall having machinery mounted thereto, said second sidewall also foldable from a first vertical position when the structure is configured as a closed container to a second position, when the structure is configured as a workshop, defining a base portion for the machinery mounted to the second sidewall.

3. The system in claim 1, further comprising a crane means housed within the structure, so that when the at least one wall is folded downward, said crane means comprises at least an arm extendable outward from the structure, to provide a hoist for use with the machinery.

4. The system in claim 1, further comprising storage space provided in the structure, said storage space defined by the mounting of the machinery on the sidewalls rather than on the floor of the structure.

5. The system in claim 1, further comprising power generating means within the structure to power the machinery when the structure is in the workshop configuration.

6. The system in claim 1, wherein the structure further comprises means to allow transporting the structure to a remote location when the structure is in the first container configuration.

7. The system in claim 1, wherein the structure may be returned to the first container configuration from the workshop configuration for transport to a second remote location.

8. The system in claim 1, wherein the workshop is utilized to manufacture, maintain, inspect, service, or test downhole equipment, such as downhole drill motors, jars, perforating guns, etc.

9. An improved mobile workshop system, comprising:
a) a structure, said structure configurable from a closed transportable container having sidewalls, a top and a floor, to an open workshop;
b) machinery elements mounted on sidewalls of the structure for use when the structure is configured in the workshop configuration;
c) the sidewalls of the structure foldable from a first vertical position when the structure is configured as a closed container to a second horizontal position, so that when the structure is configured as a workshop, said sidewalls then define a base portion for the operation of the machinery mounted thereto.

10. The system in claim 9, further comprising crane means housed within the structure, so that when the sidewalls are folded to the horizontal position, the crane means comprises a pair of arms extendable outward from the structure, to provide a hoist operable above the machinery.

11. The system in claim 9, further comprising storage space provided in the structure, said storage space defined by the mounting of the machinery on the structure walls rather than on the floor of the structure.

12. The system in claim 9, further comprising power generating means within the structure to power the machinery when the structure is configured as the workshop.

13. The system in claim 9, wherein the structure further comprises eyelet means to move the structure when the structure is transported to a remote location in the container configuration.

14. The system in claim 9, wherein the structure may be returned to the container configuration from the workshop configuration for transport to a second remote location.

15. The system in claim 9, wherein the workshop is utilized to manufacture, maintain, inspect, service or test downhole equipment.

16. A method of providing a mobile workshop for servicing downhole drilling equipment, comprising the following steps:
a) providing a structure having vertical sidewalls, a top, and a floor portion;
b) mounting machinery elements to the interior of at least one sidewall of the structure;
c) configuring the structure as a sealed container;
d) transporting the sealed container to a remote job site;
e) lowering at least one of the sidewalls upon which the machinery is mounted to a substantial vertical position, so that the sidewall defines a base upon which the machinery operates to work the downhole drilling equipment.

17. The method in claim 16, further comprising the step of providing a crane stored within the structure when it is in the container configuration, and extendable outward to a position above the machinery, when the sidewall is lowered to define the machinery base.

18. The method in claim 16, further comprising the step of storing equipment upon the floor of the container, when the machinery is mounted on the sidewall of the container.

* * * * *